United States Patent
Storck et al.

(10) Patent No.: US 11,865,771 B2
(45) Date of Patent: Jan. 9, 2024

(54) LOCALIZED TAILORING OF THREE-DIMENSIONAL ARTICLES VIA ADDITIVE MANUFACTURING

(71) Applicant: The Johns Hopkins University, Baltimore, MD (US)

(72) Inventors: Steven M. Storck, Timonium, MD (US); Morgana M. Trexler, Baltimore, MD (US); Andrew M. Lennon, Ellicott City, MD (US); Ian D. McCue, Washington, DC (US); Salahudin M. Nimer, Fulton, MD (US); Christopher M. Peitsch, Perry Hall, MD (US)

(73) Assignee: The Johns Hopkins University, Baltimore, MD (US)

( * ) Notice: Subject to any disclaimer, the term of this patent is extended or adjusted under 35 U.S.C. 154(b) by 331 days.

(21) Appl. No.: 16/937,897

(22) Filed: Jul. 24, 2020

(65) Prior Publication Data

US 2021/0026324 A1 Jan. 28, 2021

Related U.S. Application Data

(60) Provisional application No. 62/877,874, filed on Jul. 24, 2019.

(51) Int. Cl.
*G05B 19/4099* (2006.01)
*B22F 10/36* (2021.01)
(Continued)

(52) U.S. Cl.
CPC .............. *B29C 64/153* (2017.08); *B22F 1/00* (2013.01); *B22F 10/00* (2021.01); *B22F 10/28* (2021.01);
(Continued)

(58) Field of Classification Search
CPC ...... G05B 19/4099; G05B 2219/49023; B22F 10/00; B22F 10/10; B22F 10/70; B22F 12/41; B22F 12/45; B22F 2999/00; B22F 10/28; B22F 10/36; B22F 10/38; B22F 1/00; B29C 64/273; B29C 64/393; B29C 64/153; B33Y 10/00; B33Y 30/00; B33Y 50/02; B33Y 70/10; Y02P 10/25
See application file for complete search history.

(56) References Cited

U.S. PATENT DOCUMENTS

| 7,036,550 B2 * | 5/2006 | Schaffer | B33Y 10/00 164/101 |
| 10,254,499 B1 * | 4/2019 | Cohen | H01R 4/024 |

(Continued)

*Primary Examiner* — Lawrence Averick
(74) *Attorney, Agent, or Firm* — Sung T. Kim (57) ABSTRACT

Additive manufacturing processes, systems and three-dimensional articles include the formation of voxels and/or portions of three-dimensional articles with different properties relative to other voxels and/or portions. The processes generally include changing one or more laser beam parameters including power level, exposure time, hatch spacing, point distance, velocity, and energy density during the formation of selected voxels and/or portions of the three-dimensional articles. Also disclosed are processes that include an additive manufacturing process that provides localized secondary heat treatment of certain voxels and/or regions at a temperature below the melting point of the three-dimensional article but high enough to effect a localized property change.

9 Claims, 7 Drawing Sheets

(51) Int. Cl.
| | |
|---|---|
| *B29C 64/153* | (2017.01) |
| *B33Y 10/00* | (2015.01) |
| *B29C 64/393* | (2017.01) |
| *B29C 64/273* | (2017.01) |
| *B33Y 30/00* | (2015.01) |
| *B33Y 50/02* | (2015.01) |
| *B22F 10/00* | (2021.01) |
| *B33Y 70/10* | (2020.01) |
| *B22F 1/00* | (2022.01) |
| *B22F 10/28* | (2021.01) |
| *B22F 12/43* | (2021.01) |
| *B22F 10/366* | (2021.01) |
| *B22F 10/38* | (2021.01) |
| *B22F 10/73* | (2021.01) |
| *B22F 12/41* | (2021.01) |
| *B22F 12/44* | (2021.01) |
| *B22F 12/45* | (2021.01) |
| *B22F 12/90* | (2021.01) |
| *B22F 10/32* | (2021.01) |
| *B22F 10/64* | (2021.01) |

(52) U.S. Cl.
CPC ............ *B22F 10/36* (2021.01); *B22F 10/366* (2021.01); *B22F 10/38* (2021.01); *B22F 12/43* (2021.01); *B29C 64/273* (2017.08); *B29C 64/393* (2017.08); *B33Y 10/00* (2014.12); *B33Y 30/00* (2014.12); *B33Y 50/02* (2014.12); *B33Y 70/10* (2020.01); *G05B 19/4099* (2013.01); *B22F 10/32* (2021.01); *B22F 10/64* (2021.01); *B22F 10/73* (2021.01); *B22F 12/41* (2021.01); *B22F 12/44* (2021.01); *B22F 12/45* (2021.01); *B22F 12/90* (2021.01); *G05B 2219/49023* (2013.01)

(56) References Cited

U.S. PATENT DOCUMENTS

| | | | |
|---|---|---|---|
| 10,562,226 B1* | 2/2020 | Cohen | B33Y 10/00 |
| 10,639,721 B2* | 5/2020 | Das | B22F 5/009 |
| 2004/0173335 A1* | 9/2004 | Schaffer | B33Y 40/20 |
| | | | 164/98 |
| 2017/0182562 A1* | 6/2017 | Das | B33Y 50/02 |
| 2018/0193953 A1* | 7/2018 | Boswell | B22F 10/366 |

* cited by examiner

LOCALIZED TAILORING OF THREE-DIMENSIONAL ARTICLES VIA ADDITIVE MANUFACTURING

CROSS-REFERENCE TO RELATED APPLICATIONS

This application is related to and claims the benefit of prior filed U.S. Provisional Patent Application No. 62/877,874, filed on Jul. 24, 2019, which is incorporated by reference herein in its entirety.

BACKGROUND

The present disclosure generally relates to additive manufacturing (AM) processes to form three-dimensional (3D) articles and the resulting three-dimensional articles. More particularly, the present disclosure relates to AM processes that employ an energy beam such as a laser to locally tailor at least one voxel or portion of the three-dimensional article and provide the three-dimensional article with at least one different property (e.g., a mechanical property) relative to another voxel or portion.

In contrast to subtractive manufacturing techniques, AM processes are additive and generally include a sequential layer by layer build-up of a three-dimensional object of any shape from a design. In a typical AM process, a two-dimensional image of a first layer of material such as a metal, ceramic, and/or polymeric material is formed, and subsequent layers are then added one by one until such time a three-dimensional article is formed. Typically, the three-dimensional article is fabricated using a computer aided design (CAD) model. A particular type of AM process uses an energy beam, for example, an electron beam or electromagnetic radiation such as a laser beam, to thermally create each layer of the article in which particles of the powder material are bonded together and, where indicated, bonded to the underlying layer.

In AM processing of metals, a typical feedstock is a powdered metal composition of one or more metals that is sintered or fully melted by the energy input of a laser or electron beam, and as a result, is transformed layer by layer into a solid three-dimensional part of nearly any geometry. The most popular AM processes for metals include laser beam melting, electron beam melting, and laser beam deposition. During AM processing, the metal powder is subjected to a complex thermal cycle that includes rapid heating above the melting temperature of the respective metal due to energy absorption from the laser (or electron beam) and its subsequent transformation into heat to form a molten metal followed by rapid solidification after the heat source has moved on. The AM process includes numerous re-heating and re-cooling steps when subsequent layers are added to the evolving three-dimensional structure. Multiple modes of heat, mass and momentum transfer, and chemical reactions make the AM process very complex.

SUMMARY

Disclosed herein are processes for forming a three-dimensional article, a three-dimensional article integrally formed from a metal or non-metal powder composition via additive manufacturing, and an additive manufacturing system. In one or more embodiments in accordance with the present disclosure, a process for forming a three-dimensional article includes successively forming the three-dimensional article from a feedstock layer-by-layer via an additive manufacturing process, wherein the feedstock comprises a plurality of discrete metallic or non-metallic particles. The successive building of the three-dimensional article includes exposing at least one voxel and/or portion in a layer or layers to a different thermal profile to provide the three-dimensional article with at least one different property relative to other voxels and/or other portions of the three-dimensional article.

In one or more other embodiments, a process for forming a three-dimensional article includes thermally exposing a selected voxel and/or portion of the three-dimensional article with an energy beam at a temperature less than a melting point of the three-dimensional article to effect a localized change in at least one property of the selected voxel and/or portion relative to other voxels and/or portions.

In still one or more other embodiments, a process for treating a three-dimensional article includes successively forming the three-dimensional article from a feedstock layer-by-layer via an additive manufacturing process, wherein the feedstock comprises a plurality of discrete metallic or non-metallic particles; and controlling one or more local properties of the three-dimensional article by selectively changing one or more energy beam parameters selected from the group consisting of power, exposure time, point distance, hatch spacing, velocity, and energy density during the formation of the three-dimensional article, wherein the one or more local properties within at least one region of the three-dimensional article is different from other regions.

In one or more embodiments, a three-dimensional article integrally formed from a metal or non-metal powder composition via additive manufacturing includes a first voxel and/or first portion of the three-dimensional article; and at least one additional voxel and/or portion of the three-dimensional article exhibiting at least one thermally induced property obtained during the additive manufacturing process that is different from the first voxel and/or first portion.

In one or more embodiments, an additive manufacturing system for fabricating a three-dimensional article includes a three-dimensional printer; and a control processor. The control processor is operable to laser scan a metal or non-metal powder layer to form a first portion of a two-dimensional object with a first set of operating parameters and a second portion of the two dimensional object with a second set of the operating parameters, wherein the first and second set of operating parameters include at least one difference in a laser power level, an exposure time, a hatch spacing, a point distance, and an energy density to provide a different thermal profile in the first portion relative to the at least one additional portion and provide at least one different property in the first portion relative to the at least one additional portion.

Additional features and advantages are realized through the techniques of the present invention described herein according to various embodiments. Other embodiments and aspects of the invention are described in detail herein and are considered a part of the claimed invention. For a better understanding of embodiments of the invention with advantages and features, refer to the description and to the drawings.

BRIEF DESCRIPTION OF THE DRAWINGS

Example embodiments of the invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein.

DETAILED DESCRIPTION

The present disclosure is generally directed to locally tailoring at least one voxel and/or portion of three-dimensional structures, i.e., articles formed via additive manufacturing (AM) processes, to manipulate the local microstructure, composition, and/or functional properties relative to other voxels and/or portions so as to produce novel three-dimensional articles. As used herein, the term "voxel" represents a volume element in a three-dimensional space within the three-dimensional structure. The term "portion" generally refers to a cross section of the three-dimensional structure in its entirety.

In accordance with one or more embodiments, the AM process generally includes changing one or more energy beam parameters such as power, exposure time, point distance, velocity, hatch spacing (i.e., scan line spacing), and/or energy density during the AM process to locally tailor the composition, microstructure, and/or functional properties. The resulting three-dimensional article formed by the AM process can have at least one voxel and/or portion exhibiting different properties relative to other voxels and/or portions such as, for example, different transition temperatures in the case of shape memory alloys, different tensile strengths, different elastic limits, different local compositions, different local grain structures, different surface smoothing, and the like. In other embodiments, localized tailoring can be provided by secondary heat treatment using an additive manufacturing system to change a property of a selected one or more voxels and/or one or more portions of the three-dimensional articles. That is, after the initial melt and consolidation of a metal powder, for example, to form a three-dimensional metallic article or one or more layer therein, a secondary pass of the energy source can be locally applied below or near the melting point of the metal but at a high enough temperature to thermally manipulate the local properties such as the creation and/or elimination of defects, changes in microstructure, compositional changes, changes in surface roughness as well as secondary effects such as controlling mechanical properties, e.g., strength, fracture toughness, fracture direction, strain to failure, transition temperature, and the like.

Conventional techniques related to additive manufacturing processes for forming three-dimensional articles may or may not be described in detail herein. Moreover, the various tasks and process steps described herein can be incorporated into a more comprehensive procedure or process having additional steps or functionality not described in detail herein. In particular, various steps in the additive manufacture of three-dimensional articles are well known and so, in the interest of brevity, many conventional steps will only be mentioned briefly herein or will be omitted entirely without providing the well-known process details.

For the purposes of the description hereinafter, the terms "upper", "lower", "top", "bottom", "left," and "right," and derivatives thereof shall relate to the described structures, as they are oriented in the drawing figures. The same numbers in the various figures can refer to the same structural component or part thereof. Additionally, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

Spatially relative terms, e.g., "beneath," "below," "lower," "above," "upper," and the like, can be used herein for ease of description to describe one element or feature's relationship to another element(s) or feature(s) as illustrated in the figures.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the term "about" modifying the quantity of an ingredient, component, or reactant of embodiments of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like.

It will also be understood that when an element, such as a layer, region, or substrate is referred to as being "on" or "over" another element, it can be directly on the other element or intervening elements can also be present. In contrast, when an element is referred to as being "directly on" or "directly over" another element, there are no intervening elements present, and the element is in contact with another element.

Figure 1:
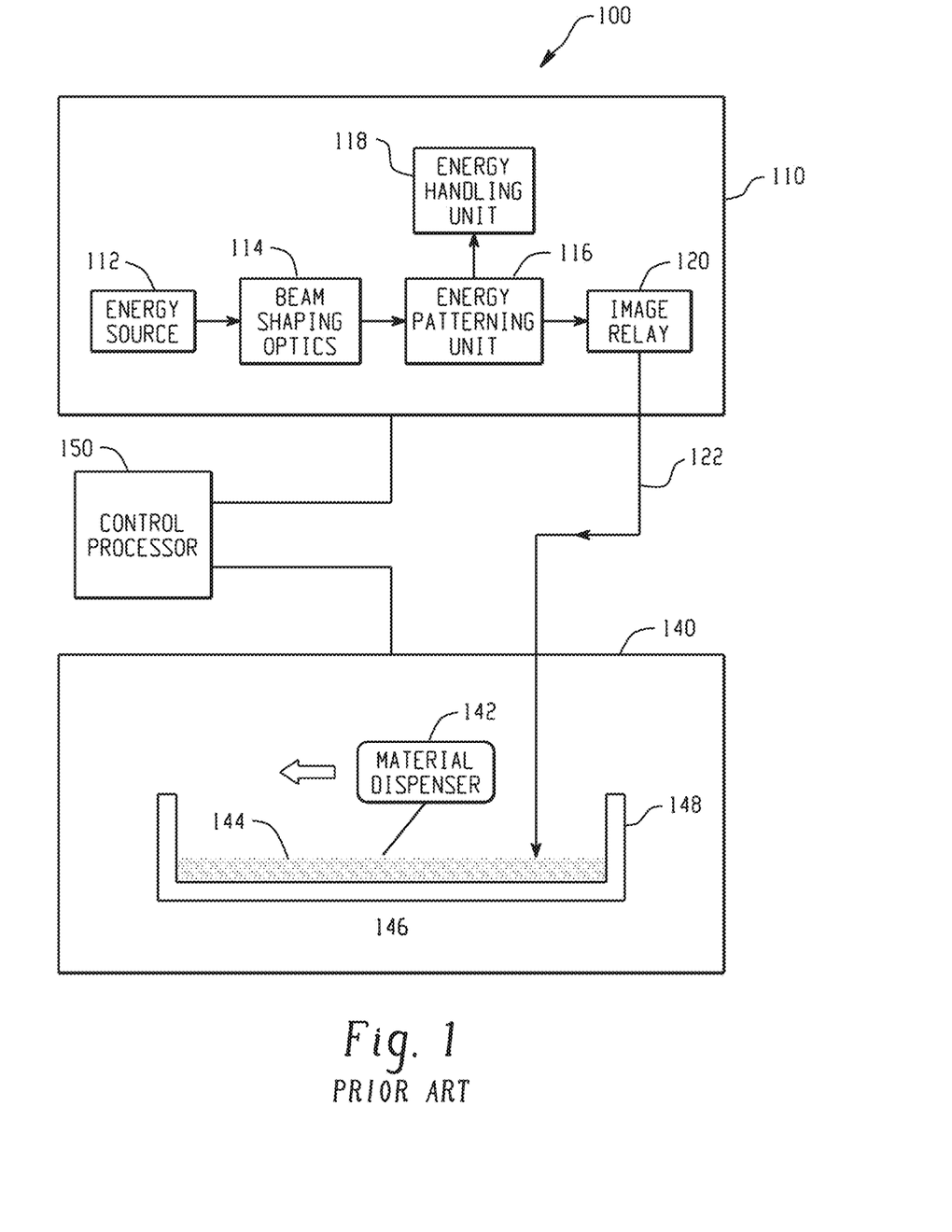
FIG. 1 illustrates an exemplary prior art additive manufacturing system.

Referring now to prior art FIG. 1, there is depicted an exemplary additive manufacturing system 100 having an energy patterning system 110 with an energy source 112 that can direct one or more continuous or pulsed energy beam(s) toward beam shaping optics 114. After shaping, if necessary, the beam is patterned by an energy patterning unit 116, with generally some energy being directed to a rejected energy handling unit 118. Patterned energy is relayed by image relay 120 toward an article processing unit 140, typically as a two-dimensional image 122 focused near a bed 146. The bed 146 (with optional walls 148) can form a chamber containing material 144 dispensed by material dispenser 142. Patterned energy, directed by the image relay 120, can melt, fuse, sinter, amalgamate, change crystal structure, influence stress patterns, or otherwise chemically or physically modify the dispensed layer of metal powder 144 to form structures with desired properties.

Energy source 112 generates photon (light), electron, ion, or other suitable energy beams or fluxes capable of being directed, shaped, and patterned. Multiple energy sources can be used in combination. The energy source 112 can include lasers, electron beams, or ion beams. Possible laser types include, but are not limited to gas lasers, chemical lasers, dye lasers, metal vapor lasers, solid state lasers (e.g. fiber), semiconductor (e.g. diode) lasers, free electron laser, gas dynamic laser, "nickel-like" samarium laser, Raman laser, nuclear pumped laser, laser pathing systems, or the like.

Exemplary gas lasers can include a helium-neon laser, argon laser, krypton laser, xenon ion laser, nitrogen laser, carbon dioxide laser, carbon monoxide laser or excimer laser. Exemplary chemical lasers can include lasers such as a hydrogen fluoride laser, deuterium fluoride laser, COIL (chemical oxygen-iodine laser), or Agil (All gas-phase iodine laser). Exemplary metal vapor lasers can include a helium-cadmium (HeCd) metal-vapor laser, helium-mercury (HeHg) metal-vapor laser, helium-selenium (HeSe) metal-vapor laser, helium-silver (HeAg) metal-vapor laser, strontium vapor laser, neon-copper (NeCu) metal-vapor laser, copper vapor laser, gold vapor laser, or manganese (Mn/$MnCl_2$) vapor laser. Exemplary solid state lasers include lasers such as a ruby laser, Nd:YAG laser, NdCrYAG laser, Er:YAG laser, neodymium YLF (Nd:YLF) solid-state laser, neodymium doped yttrium orthovanadate(Nd:$YVO_4$) laser, neodymium doped yttrium calcium oxoborate. Nd:$YCa_4O(BO_3)^3$ or simply Nd:YCOB, neodymium glass(Nd:Glass) laser, titanium sapphire (Ti:sapphire) laser, thulium YAG (Tm:YAG) laser, ytterbium YAG (Yb:YAG) laser, ytterbium:$2O_3$ (glass or ceramics) laser, ytterbium doped glass laser (rod, plate/chip, and fiber), holmium YAG (Ho:YAG) laser, chromium ZnSe (Cr:ZnSe) laser, cerium doped lithium strontium (or calcium)aluminum fluoride(Ce:LiSAF, Ce:LiCAF), promethium 147 doped phosphate glass(147$Pm^{+3}$:Glass) solid-state laser, chromium doped chrysoberyl (alexandrite) laser, erbium doped and erbium-ytterbium co-doped glass lasers, trivalent uranium doped calcium fluoride (U:$CaF_2$) solid-state laser, divalent samarium doped calcium fluoride(Sm:$CaF_2$) laser, or F-center laser. Exemplary semiconductor lasers can include laser medium types such as GaN, InGaN, AlGaInP, AlGaAs, InGaAsP, GaInP, InGaAs, InGaAsO, GaInAsSb, lead salt, Vertical cavity surface emitting laser (VCSEL), quantum cascade laser, hybrid silicon laser, or combinations thereof. For example, in one embodiment a single Nd:YAG q-switched laser can be used in conjunction with multiple semiconductor lasers. In another embodiment, an electron beam can be used in conjunction with an ultraviolet semiconductor laser array. In still other embodiments, a two-dimensional array of lasers can be used. In some embodiments with multiple energy sources, pre-patterning of an energy beam can be done by selectively activating and deactivating energy sources.

Beam shaping optics 114 can include a great variety of imaging optics to combine, focus, diverge, reflect, refract, homogenize, adjust intensity, adjust frequency, or otherwise shape and direct one or more energy beams received from the energy source 112 toward the energy patterning unit 116. In one or more embodiments, multiple light beams, each having a distinct light wavelength, can be combined using wavelength selective mirrors (e.g. dichroics) or diffractive elements. In other embodiments, multiple beams can be homogenized or combined using multifaceted mirrors, microlenses, and refractive or diffractive optical elements.

Energy patterning unit 116 can include static or dynamic energy patterning elements. For example, photon, electron, or ion beams can be blocked by masks with fixed or movable elements. To increase flexibility and ease of image patterning, pixel addressable masking, image generation, or transmission can be used. In some embodiments, the energy patterning unit includes addressable light valves, alone or in conjunction with other patterning mechanisms to provide patterning. The light valves can be transmissive, reflective, or use a combination of transmissive and reflective elements. Patterns can be dynamically modified using electrical or optical addressing. In one embodiment, a transmissive optically addressed light valve acts to rotate polarization of light passing through the valve, with optically addressed pixels forming patterns defined by a light projection source. In another embodiment, a reflective optically addressed light valve includes a write beam for modifying polarization of a read beam. In yet another embodiment, an electron patterning device receives an address pattern from an electrical or photon stimulation source and generates a patterned emission of electrons.

Rejected energy handling unit 118 may be used to disperse, redirect, or utilize energy not patterned and passed through the energy pattern image relay 120. In one embodiment, the rejected energy handling unit 118 can include passive or active cooling elements that remove heat from the energy patterning unit 116. In other embodiments, the rejected energy handling unit can include a "beam dump" to absorb and convert to heat any beam energy not used in defining the energy pattern. In still other embodiments, rejected beam energy can be recycled using beam shaping optics 114. Alternatively, or in addition, rejected beam energy can be directed to the article processing unit 140 for heating or further patterning. In certain embodiments, rejected beam energy can be directed to additional energy patterning systems or article processing units.

Image relay 120 receives a patterned image (typically two-dimensional) from the energy patterning unit 116 and guides it toward the article processing unit 140. In a manner similar to beam shaping optics 114, the image relay 120 can include optics to combine, focus, diverge, reflect, refract, adjust intensity, adjust frequency, or otherwise shape and direct the patterned image. In this manner, a melt pool at a focal point of the energy beam is formed and a deposit is created that follows a raster scan pattern of the energy beam.

Article processing unit 140 can include a walled chamber having walls 148 and bed 146, and a material dispenser 142 for distributing material. The material dispenser 142 can distribute, remove, mix, provide gradations or changes in material type or particle size, or adjust layer thickness of material. The material can include one or more metal powders capable of undergoing a thermally induced phase change from solid to liquid and back again, or combinations thereof. Unwanted material can be removed for disposal or recycling by use of blowers, vacuum systems, sweeping, vibrating, shaking, tipping, or inversion of the bed 146.

In addition to material handling components, the article processing unit 140 can include components for holding and supporting 3D structures, mechanisms for heating or cooling the chamber, auxiliary or supporting optics, and sensors and control mechanisms for monitoring or adjusting material or environmental conditions. The article processing unit 140 can, in whole or in part, support a vacuum or inert gas atmosphere to reduce unwanted chemical interactions as well as to mitigate the risks of fire or explosion (especially with reactive metals).

Control processor 150 can be connected and programmed to control any components of the additive manufacturing system 100. The control processor 150 can be connected to variety of sensors, actuators, heating or cooling systems, monitors, and controllers to coordinate operation. A wide range of sensors, including imagers, light intensity monitors, thermal, pressure, or gas sensors can be used to provide information used in control or monitoring. The control processor 150 can be a single central controller, or alternatively, can include one or more independent control systems. The control processor 150 is provided with an interface to allow input of manufacturing instructions. For example, the control processor 150 may control the operation of the energy source 112 such as its translatable position; energy beam characteristic(s), including their respective beam patterns, pulsing characteristics, positional relationships, power levels, power densities, exposure times, point distance, velocity, or any combination thereof.

The control processor 150 may include a reduced instruction set computer (RISC) microprocessor. The processors are coupled to system memory and various other components via a system bus. Read only memory (ROM) is coupled to the system bus and may include a basic input/output system (BIOS), which generally controls basic functions of additive manufacturing system.

An input/output (I/O) adapter and a network adapter can be coupled to the system bus. I/O adapter may be a small computer system interface (SCSI) adapter that communicates with a hard disk and/or tape storage drive or any other similar component. I/O adapter, hard disk, and tape storage device are collectively referred to herein as mass storage. Operating system for execution on the processing system may be stored in mass storage. A network adapter interconnects bus with an outside network enabling data processing system to communicate with other such systems. A screen (e.g., a display monitor) is connected to system bus by display, which may include a graphics adapter to improve the performance of graphics intensive applications and a video controller. In one embodiment, one or more adapters may be connected to one or more I/O busses that are connected to system bus via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus via user interface adapter and display adapter. A keyboard, mouse, and speaker all interconnected to bus via user interface adapter, which may include, for example, a super I/O chip integrating multiple device adapters into a single integrated circuit.

The additive manufacturing system can further include a graphics processing unit. Graphics processing unit is a specialized electronic circuit designed to manipulate and alter memory to accelerate the creation of images in a frame buffer intended for output to a display. In general, graphics processing unit is very efficient at manipulating computer graphics and image processing and has a highly parallel structure that makes it more effective than general-purpose CPUs for algorithms where processing of large blocks of data is done in parallel.

Thus, the system includes processing capability in the form of processors, storage capability including system memory and mass storage, input means such as keyboard and mouse, and output capability including speaker and display. A portion of system memory and mass storage can collectively store an operating system and coordinate the functions of the various components.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

A typical AM-alloy feedstock generally includes a metallic powder and/or a ceramic powder, whose particle size may vary from the nanometer scale to micron scale. In one or more embodiments, the particle size ranges from about 10 µm to about 5000 µm. The particular metals and/or ceramics defining the powder composition are not intended to be limited so long as the powder composition is capable of being melted, fused and/or sintered to form a two-dimensional image within a layer during AM processing. According to aspects of the present disclosure, the powder material can be any metallic material or non-metallic material. Non-limiting examples of metallic materials include aluminum and its alloys, titanium and its alloys, nickel and its alloys, chromium-based alloys, stainless or chrome steels, copper alloys, cobalt-chrome alloys, tantalum, niobium, iron-based alloys, combinations thereof, and the like. Non-limiting examples of ceramics include oxides, carbides, and borides such as semi-metal elements such as B, Si, Ge, Sb, and Bi, Mg, Ca, Sr, Ba, Zn, Al, Ga, in, Sn, and Pb; transition metal elements such as Sc, Y, Ti, Zr, Hf, V, Nb, Ta, Cr, Mo, W, Mn, Fe, Co, Ni, Cu, Ag, and Au; and lanthanides such as La, Ce, Pr, Nd, Sm, Er, Lu, and other lanthanoid elements or non-oxides such as carbides, borides, nitrides, and the like.

The AM process uses the powder to successively build layer-by-layer a metallic article into any desired shape and size. The use of the powder provides an opportunity to locally manipulate certain voxels and/or different portions within a layer or layers in the resulting three-dimensional article during the successive layer-by-layer buildup. Additionally, the present disclosure includes post processing of the three-dimensional article using secondary heat treatment to locally manipulate the articles as may be desired for different applications. For example, in the case of shape memory alloys, the austenite and/or martensite phase transition temperature of a complex three-dimensional metallic article can be locally changed to provide different voxels and/or portions of the metallic part with different phase change temperatures. In other examples, adhesive properties can be manipulated at an interface between layers of different metals and/or ceramics in a multilayer article. Still further, local changes can be used to provide a desired fracture path of a three-dimensional article. As noted above, the particular property is not intended to be limited and can be varied depending on the intended application.

Detailed embodiments of methods for locally tailoring three-dimensional articles via AM processes and the resulting three-dimensional articles according to aspects of the present invention will now be described herein. However, it is to be understood that the embodiments of the invention described herein are merely illustrative of the process and structures that can be embodied in various forms. In addition, each of the examples given in connection with the various embodiments of the invention is intended to be illustrative, and not restrictive. Further, the figures are not necessarily to scale, some features can be exaggerated to show details of particular components. Therefore, specific structural and functional details described herein are not to be interpreted as limiting, but merely as a representative basis for teaching one skilled in the art to variously employ the methods and structures of the present description.

Figure 2:
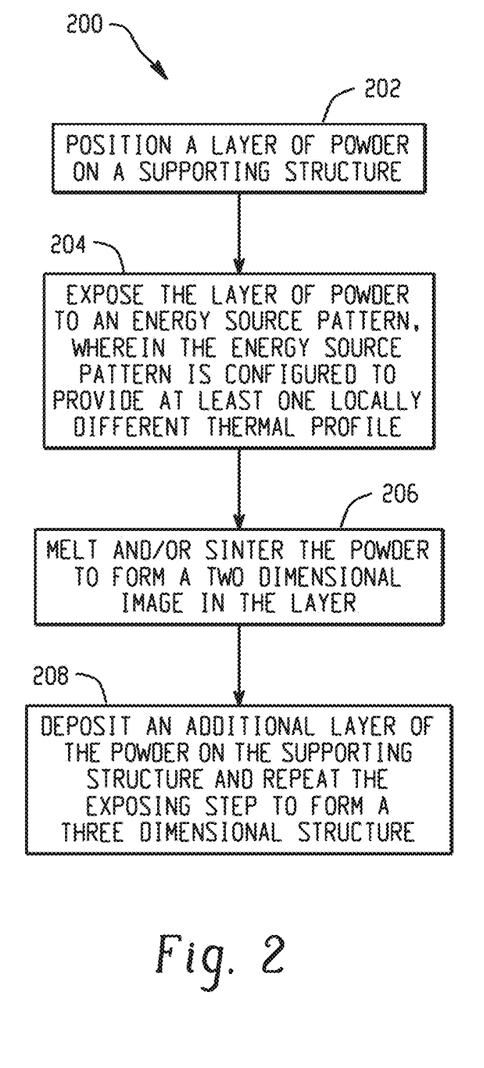
FIG. 2 is a flow chart detailing an additive manufacturing process in accordance with one or more embodiments of the present invention.

FIG. 2 is a flow chart of an AM process 200 in accordance with one or more embodiments the present disclosure. In step 202, the process includes positioning a layer of a powder on a suitable supporting structure. The powder is not intended to be limited to any particular composition and can include one or more metals and/or ceramics as will be discussed in greater detail below. The powder composition is capable of being melted, fused and/or sintered to form a two-dimensional image within a layer and a three-dimensional structure upon successive layer by layer buildup. In step 204, the layer of powder is exposed to an energy source (or beam) pattern as defined by a control processor and relayed to the layer of powder. The energy source pattern is configured to provide at least one locally different thermal profile to a selected voxel(s) or a portion(s) of the layer to change a property therein relative to other voxel(s) or portion(s). As will be discussed in greater detail, one or more energy beam parameters such as power, exposure time, point distance, hatch spacing (i.e., scan line spacing), velocity, and energy density defining the energy beam can be changed during the AM process to locally tailor the composition and/or microstructure properties and/or functional properties. In step 206, the layer of powder absorbs the energy source pattern to form a cohesive two-dimensional structure, such as an image in the layer. In step 208, the process is repeated to continue building the three-dimensional structure layer by layer by depositing an additional layer of powder on the supporting structure and repeating the exposing step 204 to form the three-dimensional structure. In this manner, different voxels and/or portions can have locally different properties tailored for a desired application.

Figure 3:
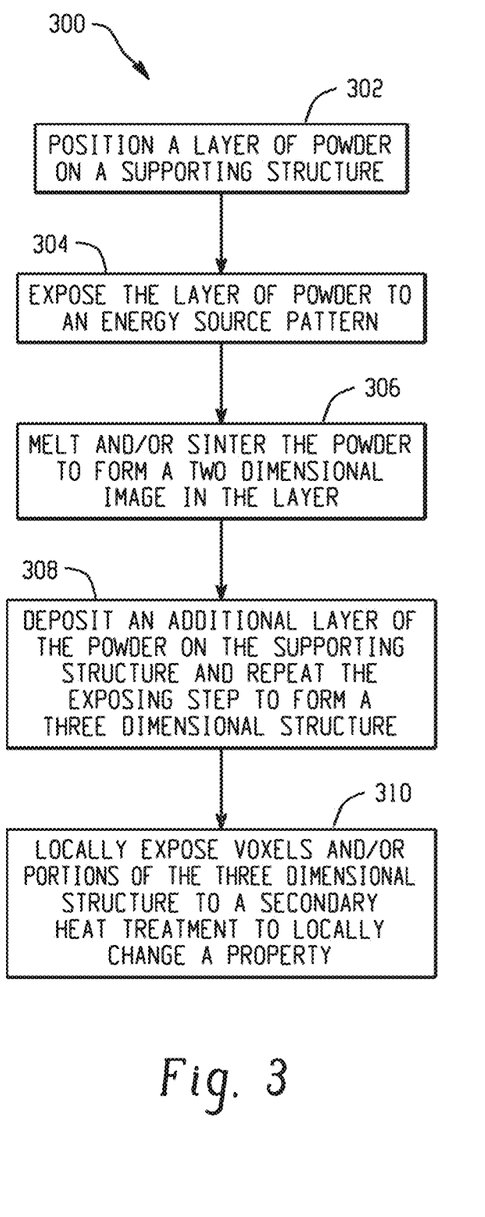
FIG. 3 is a flow chart detailing an additive manufacturing process in accordance with one or more embodiments of the present invention.

FIG. 3 is a flow chart of an AM process 300 in accordance with one or more embodiments the present disclosure. The process generally includes positioning a layer of a powder on a suitable supporting structure as shown in step 302. In step 304, the layer of powder is exposed to an energy source (or beam) pattern as defined by a control processor and relayed to the layer of powder, which may or may not be configured to provide at least one locally different thermal profile to a selected voxel(s) or a portion(s) of the layer to change a property therein relative to other voxel(s) or portion(s), e.g., change one or more energy beam parameters such as power, exposure time, point distance, velocity, hatch spacing, and energy density defining the energy beam. In step 306, the layer of powder absorbs the energy source pattern to form a two-dimensional image in the layer. In step 308, the process is repeated to continue building the three-dimensional structure layer by layer by depositing an additional layer of powder on the supporting structure and repeating the exposing step 304 to form the three-dimensional structure. In step 310, a secondary heat treatment step is locally applied that includes locally exposing one or more selected voxels and/or portions of the three-dimensional structure to a secondary heat treatment, such as an energy beam pattern, to locally heat the voxel and/or portion below the melting point of the three-dimensional structure but high enough to change a local property or properties, e.g., increase intermixing of one metal relative to another metal to improve interfacial adhesion.

As demonstrated in the flow charts provided in FIGS. 2 and 3, localized tailoring of the three-dimensional structure can provide the resulting structure with different voxels and/or discrete portions within and about the structure to provide different properties than other voxels and/or portions. The localized tailoring can occur during fabrication of the layer by layer buildup as indicated in AM process 200 or subsequent to the structure being formed by an AM process as indicated in AM process 300.

In the various commercially available additive manufacturing systems, the parameters defining the energy beam can vary widely. Generally, the power of these additive manufacturing systems can be adjusted from about 10 to about 5000 W and will generally depend on the type of laser, the scanning velocity (which defines the exposure time) can be adjusted from about 100 mm/s to about 10,000 mm/s, hatch spacing (i.e., distance between adjacent scan lines) can be adjusted from about 10 μm to about 5000 μm, the energy density can range from about 10 J/mm$^3$ to 10,000 J/mm$^3$, the point distance can be in a range of about 10 μm to about 5000 μm, and layer thickness can be adjusted from about 10 μm to about 5,000 μm.

Figure 4:
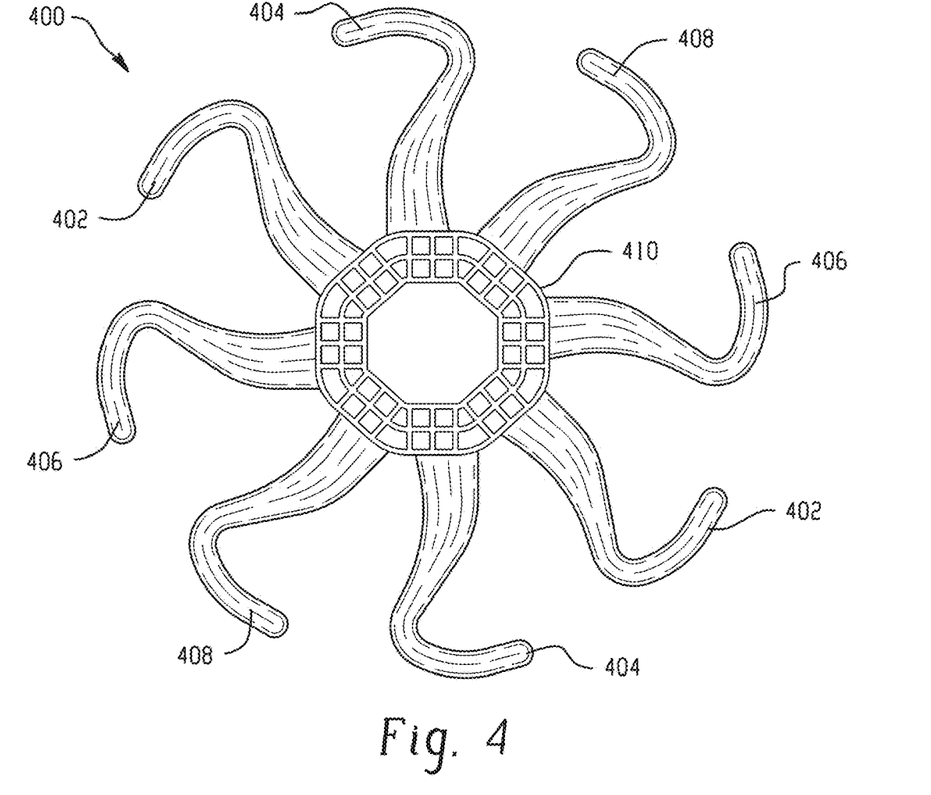
FIG. 4 pictorially illustrates a top down view of a complex three-dimensional metallic article produced by an additive manufacturing process in accordance with one or more embodiments of the present invention.

By way of example, FIG. 4 depicts a three-dimensional structure 400 including a plurality of arms 402, 404, 406, and 408 extending radially about a central ring structure 410. The three-dimensional structure 400 was formed from a metal powder composition including equiatomic amounts of nickel (Ni) and titanium (Ti) to provide the three-dimensional NiTi structure with superelasticity and shape memory properties. Shape memory alloys, such as the NiTi alloy above, are alloy compositions with at least two different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$). When the shape memory alloy is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). It should be noted that the above-mentioned transition temperatures are functions of the stress experienced by the shape memory alloy article. Specifically, these temperatures increase with increasing stress. In view of the foregoing properties, deformation of the shape memory alloy is preferably at or below the austenite transition temperature (at or below $A_s$). Subsequent heating above the austenite transition temperature causes the deformed shape memory material sample to revert back to its permanent shape. Thus, a suitable activation signal for use with shape memory alloys is a thermal activation signal having a magnitude that is sufficient to cause transformations between the martensite and austenite phases. In the present disclosure, the temperature at which the shape memory alloy remembers its high temperature form when heated can be locally adjusted during the AM process to form the three-dimensional structure or subsequent to formation using a secondary heat treatment process.

After formation of the three-dimensional NiTi shape memory alloy structure by the AM process 300, the structure was then subjected to a secondary heat treatment to locally manipulate the austenite peak temperatures in various portions of the structure. As used herein, the term "austenite peak temperature" is generally defined as the temperature of the endothermic peak position of the martensite to austenite transformation using differential scanning calorimetry (DSC) upon heating. While not wanting to be bound by theory, it is believed that local laser manipulation of the nickel concentration within the alloy composition provides the mechanism for transition temperature manipulation, which results in sequestration of the nickel in nickel-rich precipitates and evaporation of the nickel, thereby depleting the nickel in the matrix. As such, the laser operating parameters such as power, energy density, exposure time, velocity, point distance and hatch spacing can be used to locally adjust the relative volume fractions of nickel and titanium. Localized secondary heat treatment of the different radial arms 402, 404, 406, and 408 in their entirety was effected by changing one or more energy beam parameters during the AM process including power, exposure time, point distance, hatch spacing, and energy density in accordance with the conditions depicted in Table 1. Exposure time can be adjusted by changing the scan speed during the AM secondary heat treatment process. The additive manufacturing system was a 400 W Renishaw AM400 system and included a fiber pulsed laser with a beam diameter of 70 µm operated with the parameter sets shown below. The powder composition included equiatomic amounts of Ni and Ti having a median diameter (D50) of 41 µm at a density of 3.6 g/cm$^3$. The particle size distribution included a D10 of 26 µm and a D90 of 61 µm.

TABLE 1

| | Condition | | | | |
|---|---|---|---|---|---|
| Units | Power (W) | $E_t$ (µs) | $P_d$ (µm) | Hatch Spacing (µm) | Energy Density (J/mm$^2$) |
| 402 | 200 | 65 | 58 | 60 | 62.8 |
| 404 | 200 | 65 | 58 | 140 | 26.9 |

TABLE 1-continued

| | Condition | | | | |
|---|---|---|---|---|---|
| Units | Power (W) | $E_t$ (µs) | $P_d$ (µm) | Hatch Spacing (µm) | Energy Density (J/mm$^2$) |
| 406 | 225 | 50 | 70 | 120 | 22.3 |
| 408 | 200 | 65 | 58 | 100 | 37.6 |

Figure 5:
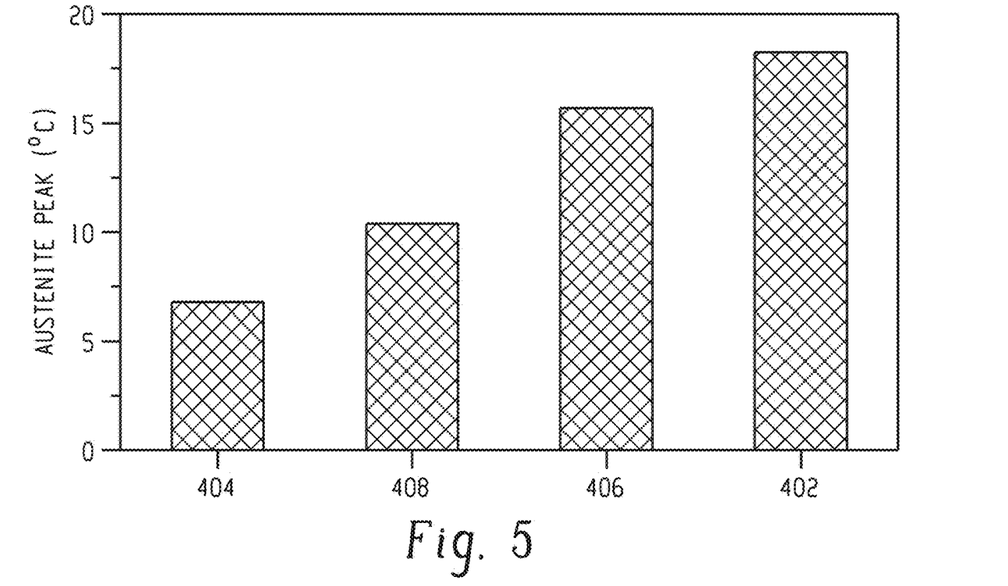
FIG. 5 graphically illustrates the austenite peak temperature for different radially extending arms of the complex three-dimensional metallic article of FIG. 4 in accordance with one or more embodiments of the present invention.

Referring now to FIG. 5, there is graphically depicted a bar chart illustrating the magnitude of the austenite peak temperature (° C.) change as a function of the localized secondary heat treatment for the different radially extending arms 402, 404, 406, and 408. As shown, manipulation of the different energy beam parameters for the different arms during secondary heat treatment significantly changed the austenite peak temperature. Functionally, this means that different regions of a part can have different strengths, different elastic limits, different transition temperatures, and the like. In the past, alloying constituents defining the shape memory alloy were adjusted to control the transformation temperatures. In contrast, the present disclosure advantageously provides local tailoring or properties without adjusting alloying constituents by changing the energy beam parameters during AM processing resulting in unique structures.

Other examples of localized tailoring and tuning of shape memory alloy properties such as the austenite peak temperature is demonstrated in Tables 2-4 below, which provide the austenite peak temperature for a shape memory alloy formed of NiTi, NiTi plus 1% manganese (Mn), and a NiTi plus 2.58% Mn, respectively.

TABLE 2

| | NiTi | | | | | | |
|---|---|---|---|---|---|---|---|
| Sample No. | Austenite Peak Temp. (° C.) | Power (W) | Exposure Time (µs) | Point Distance (µm) | Hatch (µm) | Energy Density (J/mm$^3$) | P*Et/d |
| 10 | 99.3333 | 160 | 80 | 70 | 40 | 152.4 | 182.9 |
| 11 | 99.5 | 160 | 80 | 70 | 50 | 121.9 | 182.9 |
| 13 | 97.3333 | 160 | 80 | 70 | 70 | 87.1 | 182.9 |
| 14 | 96.3333 | 160 | 80 | 70 | 80 | 76.2 | 182.9 |
| 15 | 95 | 160 | 80 | 70 | 90 | 67.7 | 182.9 |
| 16 | 93.5 | 160 | 80 | 70 | 100 | 61 | 182.9 |
| 17 | 92.3333 | 160 | 80 | 70 | 110 | 55.4 | 182.9 |
| 18 | 90.8333 | 160 | 80 | 70 | 120 | 50.8 | 182.9 |
| 19 | 90.5 | 160 | 80 | 70 | 130 | 46.9 | 182.9 |
| 20 | 89.8333 | 160 | 80 | 70 | 140 | 43.5 | 182.9 |
| 21 | 94.5 | 190 | 57 | 62 | 104 | 56 | 174.7 |
| 22 | 89.5 | 201 | 66 | 40 | 140 | 79 | 331.7 |
| 23 | 98.8333 | 201 | 58.5 | 58 | 60 | 112.5 | 202.7 |
| 24 | 99.5 | 80 | 70.5 | 40 | 60 | 78.3 | 141 |
| 25 | 99.6667 | 124 | 120 | 80 | 60 | 103.3 | 186 |
| 26 | 98.6667 | 300 | 57 | 80 | 60 | 118.8 | 213.8 |
| 27 | 92.8333 | 300 | 70.5 | 40 | 104 | 169.5 | 528.8 |
| 28 | 92.6667 | 300 | 74.5 | 62 | 104 | 115.9 | 360.5 |
| 29 | 99.1667 | 124 | 120 | 40 | 60 | 206.7 | 372 |
| 30 | 87 | 200 | 80 | 40 | 186.2 | 71.6 | 400 |
| 31 | 88.6667 | 200 | 80 | 53 | 156.4 | 64.3 | 301.9 |
| 32 | 90.8333 | 200 | 80 | 80 | 122.5 | 54.4 | 200 |
| 33 | 95 | 200 | 40 | 80 | 86.2 | 38.7 | 100 |
| 34 | 88.3333 | 200 | 80 | 40 | 159.6 | 83.5 | 400 |
| 35 | 89.5 | 200 | 80 | 40 | 139.7 | 95.5 | 400 |
| 36 | 91.6667 | 200 | 80 | 40 | 111.7 | 119.3 | 400 |
| 38 | 92.3333 | 200 | 80 | 80 | 91.9 | 72.6 | 200 |

TABLE 3

NiTi + 1% Mn

| Sample # | Austenite Peak Temperature (° C.) | Power (W) | Exposure Time (μs) | Point Distance (μm) | Hatch (μm) | Energy Density (J/mm³) | P*Et/d |
|---|---|---|---|---|---|---|---|
| 10 | 44.8333 | 160 | 80 | 70 | 40 | 152.4 | 182.9 |
| 11 | 43.6667 | 160 | 80 | 70 | 50 | 121.9 | 182.9 |
| 12 | 41.3333 | 160 | 80 | 70 | 60 | 101.6 | 182.9 |
| 14 | 42.3333 | 160 | 80 | 70 | 80 | 76.2 | 182.9 |
| 15 | 43.3333 | 160 | 80 | 70 | 90 | 67.7 | 182.9 |
| 16 | 40.5 | 160 | 80 | 70 | 100 | 61 | 182.9 |
| 17 | 36.3333 | 160 | 80 | 70 | 110 | 55.4 | 182.9 |
| 18 | 38.5 | 160 | 80 | 70 | 120 | 50.8 | 182.9 |
| 19 | 38.6667 | 160 | 80 | 70 | 130 | 46.9 | 182.9 |
| 20 | 34.8333 | 160 | 80 | 70 | 140 | 43.5 | 182.9 |
| 21 | 38.1667 | 190 | 57 | 62 | 104 | 56 | 174.7 |
| 22 | 37 | 201 | 66 | 40 | 140 | 79 | 331.7 |
| 23 | 46.1667 | 201 | 58.5 | 58 | 60 | 112.5 | 202.7 |
| 24 | 45.8333 | 80 | 70.5 | 40 | 60 | 78.3 | 141 |
| 25 | 43.8333 | 124 | 120 | 80 | 60 | 103.3 | 186 |
| 26 | 45.5 | 300 | 57 | 80 | 60 | 118.8 | 213.8 |
| 27 | 42.5 | 300 | 70.5 | 40 | 104 | 169.5 | 528.8 |
| 28 | 40.3333 | 300 | 74.5 | 62 | 104 | 115.9 | 360.5 |
| 29 | 43.1667 | 124 | 120 | 40 | 60 | 206.7 | 372 |
| 30 | 33.1667 | 200 | 80 | 40 | 186.2 | 71.6 | 400 |
| 31 | 36.1667 | 200 | 80 | 53 | 156.4 | 64.3 | 301.9 |
| 32 | 36.3333 | 200 | 80 | 80 | 122.5 | 54.4 | 200 |
| 33 | 38.8333 | 200 | 40 | 80 | 86.2 | 38.7 | 100 |
| 34 | 33.3333 | 200 | 80 | 40 | 159.6 | 83.5 | 400 |
| 35 | 36.6667 | 200 | 80 | 40 | 139.7 | 95.5 | 400 |
| 36 | 36.6667 | 200 | 80 | 40 | 111.7 | 119.3 | 400 |
| 37 | 40 | 200 | 80 | 40 | 74.5 | 179 | 400 |
| 38 | 40 | 200 | 80 | 80 | 91.9 | 72.6 | 200 |
| 39 | 44.6667 | 200 | 80 | 80 | 73.5 | 90.7 | 200 |
| 40 | 44.1667 | 200 | 80 | 80 | 49 | 136.1 | 200 |

TABLE 4

NiTi + 2.58%Mn

| Sample # | Austenite Peak Temperature (° C.) | Power (W) | Exposure Time (μs) | Point Distance (μm) | Hatch (μm) | Energy Density (J/mm³) | P*Et/d |
|---|---|---|---|---|---|---|---|
| 14 | 0.166667 | 160 | 80 | 70 | 80 | 76.2 | 182.9 |
| 15 | 1.16667 | 160 | 80 | 70 | 90 | 67.7 | 182.9 |
| 16 | 2 | 160 | 80 | 70 | 100 | 61 | 182.9 |
| 17 | −1.33333 | 160 | 80 | 70 | 110 | 55.4 | 182.9 |
| 18 | −5.16667 | 160 | 80 | 70 | 120 | 50.8 | 182.9 |
| 19 | −9.5 | 160 | 80 | 70 | 130 | 46.9 | 182.9 |
| 20 | −7 | 160 | 80 | 70 | 140 | 43.5 | 182.9 |
| 21 | 0.833333 | 190 | 57 | 62 | 104 | 56 | 174.7 |
| 22 | −5.16667 | 201 | 66 | 40 | 140 | 79 | 331.7 |
| 23 | 4.33333 | 201 | 58.5 | 58 | 60 | 112.5 | 202.7 |
| 24 | 5.16667 | 80 | 70.5 | 40 | 60 | 78.3 | 141 |
| 26 | 8.33333 | 300 | 57 | 80 | 60 | 118.8 | 213.8 |
| 27 | 5.16667 | 300 | 70.5 | 40 | 104 | 169.5 | 528.8 |
| 29 | 6 | 124 | 120 | 40 | 60 | 206.7 | 372 |
| 30 | −10.8333 | 200 | 80 | 40 | 186.2 | 71.6 | 400 |
| 31 | −6.5 | 200 | 80 | 53 | 156.4 | 64.3 | 301.9 |
| 32 | 1.83333 | 200 | 80 | 80 | 122.5 | 54.4 | 200 |
| 34 | −13 | 200 | 80 | 40 | 159.6 | 83.5 | 400 |
| 35 | −3.5 | 200 | 80 | 40 | 139.7 | 95.5 | 400 |
| 36 | 5.66667 | 200 | 80 | 40 | 111.7 | 119.3 | 400 |
| 37 | 9.16667 | 200 | 80 | 40 | 74.5 | 179 | 400 |
| 39 | 10.1667 | 200 | 80 | 80 | 73.5 | 90.7 | 200 |
| 40 | 15.8333 | 200 | 80 | 80 | 49 | 136.1 | 200 |

Figure 6:
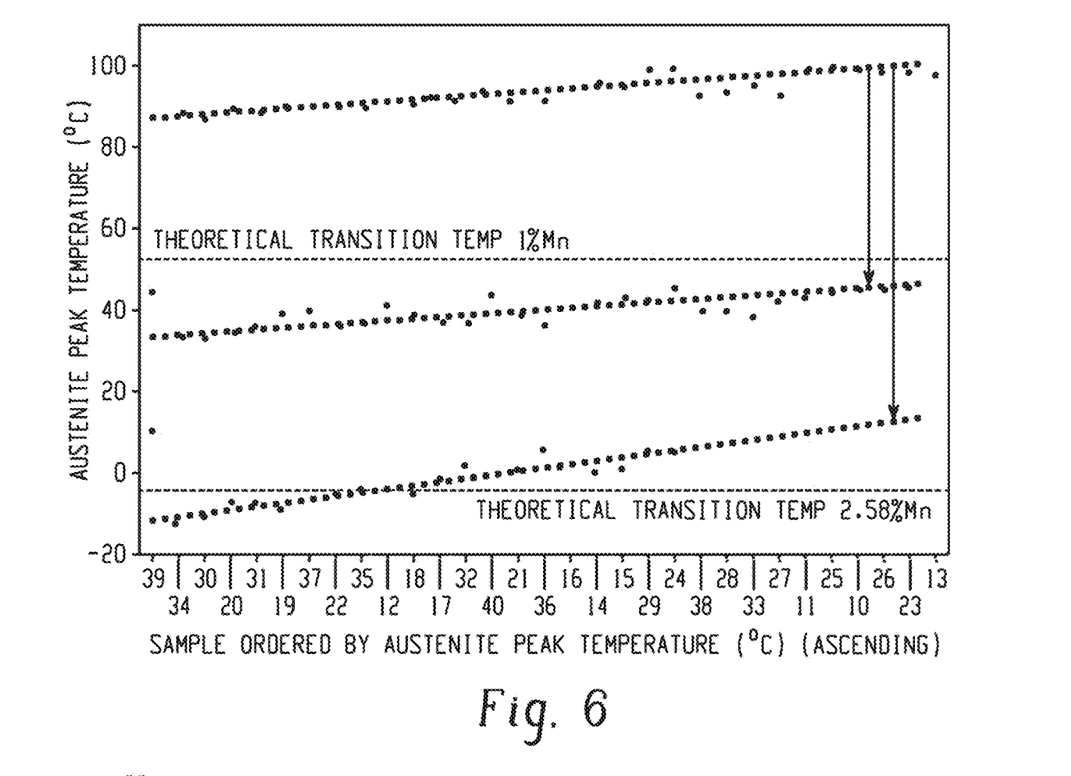
FIG. 6 graphically illustrates the change in austenite peak temperature for NiTi shape memory alloys including different manganese concentrations in accordance with one or more embodiments of the present invention.
Figure 7:
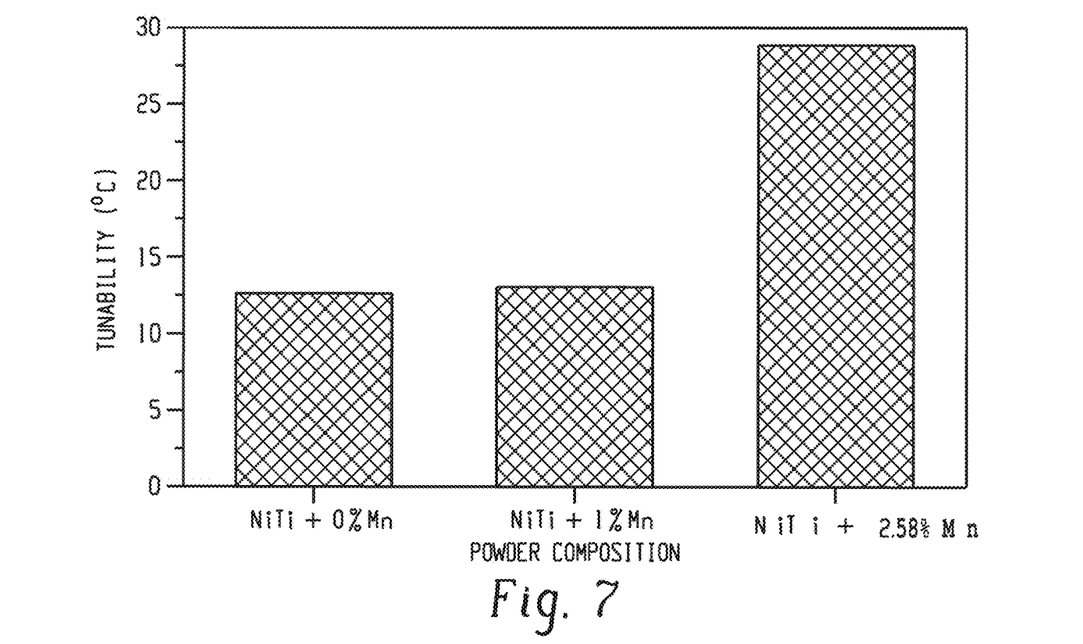
FIG. 7 is a bar chart illustrating the magnitude of austenite peak temperature change for NiTi shape memory alloys including different manganese concentrations in accordance with one or more embodiments of the present invention.

As demonstrated in Tables 2-4, the effect of manganese in the NiTi shape memory alloy composition and the locally selected operating parameters including power, exposure time, point distance, hatch spacing and energy density can be used to provide shape memory alloys with austenite peak temperatures across a wide temperature range that is not obtainable by compositional changes alone. The tuning of the transition temperatures in this manner is graphically shown in FIGS. 6 and 7. FIG. 6 graphically illustrates the effect of the manganese concentration on the austenite peak temperate as a function of a particular operating parameter set as provided in Tables 2-4. FIG. 7 provides a bar chart that more clearly illustrates the magnitude of the tunability range of the austenite peak temperatures associated with the AM operating parameters for the different concentrations of manganese in the NiTi alloy.

Although reference was made to locally tailoring the transformation properties of a NiTi shape memory alloys, the present disclosure is not intended to be limited as such. Other exemplary materials include, but are not intended to be limited to, metal powder compositions that result in the formation of three-dimensional metallic articles of indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The shape memory alloys generally have a limited operational temperature that can be further manipulated through the addition of relatively small amounts of metals such as aluminum, manganese, cobalt, iron, gold, zirconium, hafnium, platinum, palladium and the like. In one or more embodiments, these additional metals can be provided within the powder composition used during the AM process or on surfaces of the particles defining the shape memory alloy. The alloys can be binary, ternary, or any higher order so long as the alloy composition exhibits a shape memory effect, e.g., change in shape, orientation, yield strength, flexural modulus, damping capacity, superelasticity, and/or similar properties.

Figure 8:
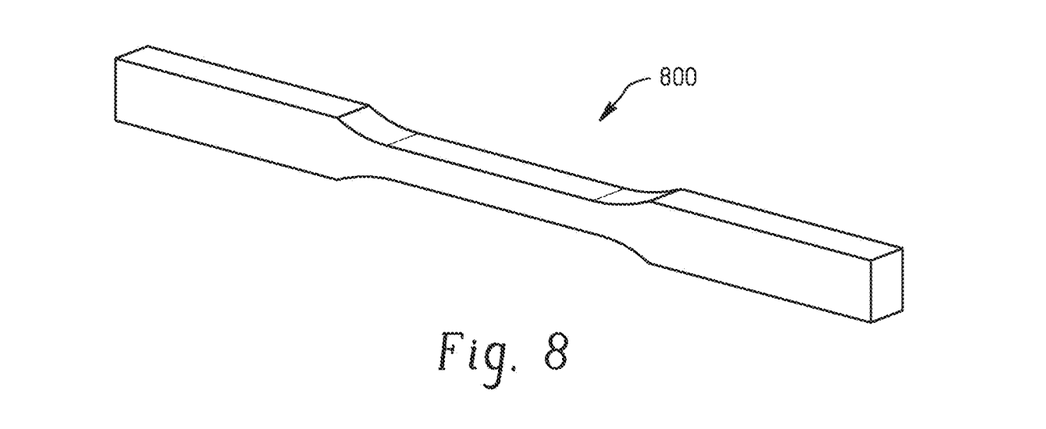
FIG. 8 pictorially illustrates a metallic coupon subsequent to secondary heat treatment using an additive manufacturing system to control failure and fracture surface in accordance with one or more embodiments of the present invention.
Figure 9:
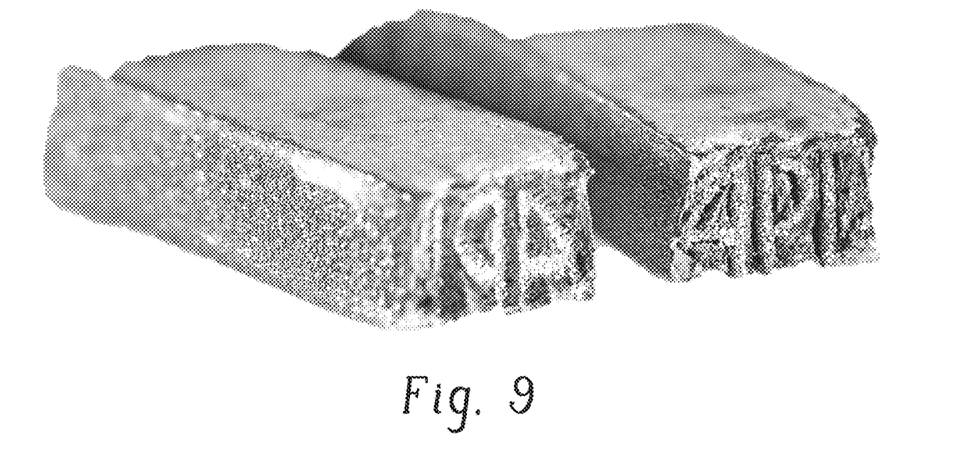
FIG. 9 pictorially illustrates the metallic coupon of FIG. 8 subsequent to pulling the metallic coupon to failure in accordance with one or more embodiments of the present invention.

In another example, the fracture toughness, fracture direction, and strain to failure of a type 316 L stainless steel coupon was locally manipulated by the AM process using an EOS m290. Type 316 L is an iron composition including less than 0.03% carbon, 16 to 18.5% chromium, 10 to 14% nickel, 2 to 3% molybdenum, less than 1% manganese, less than 1% silicon, less than 0.045% phosphorous, and less than 0.03% sulfur. An exemplary shape of a flat Type 316 L stainless steel coupon 800 is shown in FIG. 8. The central portion had a thickness of 4 mm and a width of 6 mm. Other shapes included a cylinder having diameters of 10 mm and 15 mm and a tension bar having the logo shifted at a 45 degree angle relative to the previous sample to highlight the ability to control orientation in 3 dimensions. The locally embedded defects were formed by heating selected portions of the central portion under varying laser operating parameters such as, for example, 350 W, velocity 850 mm/s and hatch spacing of 0.09 mm to change the local microstructure relative to the bulk microstructure and form the letters "APL". The coupon was pulled to failure, which resulted in revealing the letters "APL" on the fracture surface as shown in FIG. 9. Clearly, the localized secondary heat treatment influenced ductile failure by introducing a local embedded defect pattern, which upon examination included keyhole (pores) or lack of fusion defects depending on the operating parameters.

Table 5 provides the operating parameters that resulted in either keyhole or lack of fusion defects in the different shaped articles depending on the local operating parameters applied in selected local portions of the type 316 L steel. The power and scan speed were locally adjusted as indicated below to form the APL letters. Hatch spacing was constant.

TABLE 5

| Sample | Power (W) | Velocity (mm/s) | Hatch Spacing (mm) | Notes |
|---|---|---|---|---|
| APL Cylinder | | | | |
| 1 | 50 | 1083 | 0.09 | APL-lack of fusion defects |
|  | 195 | 1083 | 0.09 | Cylinder |
| 2 | 370 | 900 | 0.09 | APL-keyhole defects |
|  | 195 | 1083 | 0.09 | Cylinder |
| APL Tension Bar - Flat | | | | |
| 1 | 50 | 1083 | 0.09 | APL-lack of fusion defects |
|  | 195 | 1083 | 0.09 | Tensile Bar |
| 2 | 370 | 900 | 0.09 | APL-keyhole defects |
|  | 195 | 1083 | 0.09 | Tensile Bar |
| APL Tension Bar - 45 | | | | |
| 1 | 50 | 1083 | 0.09 | APL-lack of fusion defects |
|  | 195 | 1083 | 0.09 | Tensile Bar |
| 2 | 370 | 900 | 0.09 | APL-keyhole defects |
|  | 195 | 1083 | 0.09 | Tensile Bar |

Advantageously, by locally changing the mechanical performance, one can manipulate material failure so that the coupon can act in a similar manner to a fuse, which can be used to remove the metallic article from service. For example. local corrosion behavior can advantageously be controlled by the secondary heat treatment to provide a "remove from service" indicator once a certain load or corrosion level has been obtained.

Figure 10:
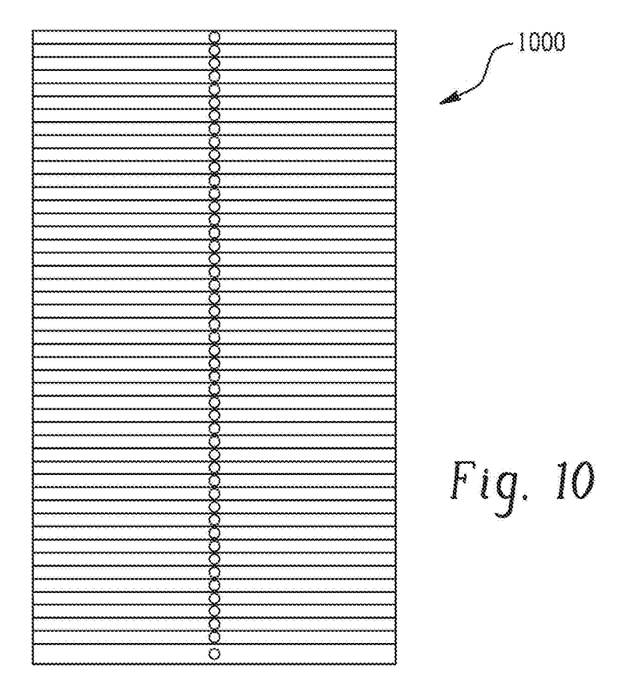
FIG. 10 is a cross section of a metal layer stack produced using an additive manufacturing process to form a porosity gradient in accordance with one or more embodiments of the present invention.

In another example, a functional property such as porosity was locally manipulated and optimized using the AM process in accordance with the present disclosure. In this example, porosity optimization was provided using the AM process during additive formation of an Inconel 718 nickel-based alloy stack, wherein each layer build in the z-direction was subjected to a multi-variable evaluation using an experimental design that included a power level, an exposure time, a hatch spacing, a point distance, and an energy density to form a porosity gradient. An EOS M290 Yb-fiber laser metal printer having a focus diameter of 100 µm was used to execute the following layer manipulation in accordance to the processing parameters outlined in Table 6 below. A layer thickness of 0.5 mm was used per parameter set, wherein porosity was optimized using design of experiments to provide a density greater than 99.9%. A cross sectional view of the multilayer build stack 1000 is shown in FIG. 10. Subsequent to formation of each build layer, each build plane was examined using electron backscatter diffraction (EBSD) in order to analyze, visualize and quantify the porosity associated with a particular parameter set. Table 6 below details the parameter set for different layers and the associated porosity percentage.

TABLE 6

| Power (W) | Speed (mm/s) | Hatch (um) | Energy density (J/mm$^2$) | Porosity (%) |
|---|---|---|---|---|
| 124.49 | 2657.14 | 0.09 | 12.61 | 23.76 |
| 240.82 | 2771.43 | 0.14 | 14.99 | 20.10 |
| 106.12 | 2257.14 | 0.07 | 17.19 | 17.42 |
| 136.73 | 1914.29 | 0.10 | 18.62 | 16.24 |
| 222.45 | 2314.29 | 0.14 | 17.32 | 15.73 |
| 142.86 | 942.86 | 0.18 | 21.21 | 13.53 |
| 118.37 | 1057.14 | 0.12 | 22.67 | 11.73 |
| 375.51 | 2485.71 | 0.19 | 19.48 | 11.53 |
| 400.00 | 2542.86 | 0.16 | 25.03 | 6.96 |
| 277.55 | 1571.43 | 0.19 | 23.52 | 6.03 |
| 338.78 | 2142.86 | 0.16 | 24.67 | 4.37 |

TABLE 6-continued

| Power (W) | Speed (mm/s) | Hatch (um) | Energy density (J/mm²) | Porosity (%) |
|---|---|---|---|---|
| 200 | 336 | 0.11 | 134.9 | 3.49 |
| 295.92 | 1628.57 | 0.17 | 26.82 | 3.28 |
| 100.00 | 428.57 | 0.17 | 33.83 | 3.14 |
| 387.76 | 1742.86 | 0.20 | 28.24 | 2.59 |
| 228 | 384 | 0.11 | 134.9 | 2.46 |
| 210.20 | 1171.43 | 0.15 | 29.11 | 2.18 |
| 256 | 431 | 0.11 | 134.9 | 1.91 |
| 216.33 | 2942.86 | 0.06 | 31.05 | 1.86 |
| 228.57 | 2428.57 | 0.08 | 30.34 | 1.33 |
| 259.18 | 2028.57 | 0.11 | 30.39 | 1.17 |
| 148.98 | 1114.29 | 0.10 | 32.76 | 1.09 |
| 228 | 960 | 0.176 | 33.7 | 0.67 |
| 256 | 960 | 0.198 | 33.7 | 0.64 |
| 381.63 | 485.71 | 0.15 | 132.76 | 0.57 |
| 200 | 960 | 0.154 | 33.7 | 0.54 |
| 313 | 527 | 0.11 | 134.9 | 0.53 |
| 344.90 | 1514.29 | 0.18 | 32.44 | 0.49 |
| 342 | 576 | 0.11 | 134.9 | 0.46 |
| 246.94 | 1400.00 | 0.14 | 32.49 | 0.45 |
| 191.84 | 1285.71 | 0.11 | 34.49 | 0.34 |
| 285 | 672 | 0.079 | 135 | 0.22 |
| 370 | 623 | 0.11 | 134.9 | 0.20 |
| 256 | 1725 | 0.11 | 33.7 | 0.20 |
| 370 | 2493 | 0.11 | 33.7 | 0.19 |
| 342 | 2304 | 0.11 | 33.7 | 0.15 |
| 285 | 768 | 0.069 | 135 | 0.13 |
| 313 | 2109 | 0.11 | 33.7 | 0.12 |
| 200 | 1344 | 0.11 | 33.7 | 0.12 |
| 313 | 960 | 0.06 | 134.9 | 0.10 |
| 228 | 1536 | 0.11 | 33.7 | 0.09 |
| 285 | 864 | 0.061 | 135 | 0.09 |
| 357.14 | 2200.00 | 0.09 | 45.20 | 0.08 |
| 370 | 960 | 0.071 | 134.9 | 0.08 |
| 302.04 | 600.00 | 0.17 | 75.66 | 0.08 |
| 228 | 960 | 0.044 | 134.9 | 0.07 |
| 285 | 672 | 0.157 | 67.5 | 0.07 |
| 320.41 | 1342.86 | 0.12 | 49.54 | 0.07 |
| 285 | 528 | 0.2 | 67.5 | 0.07 |
| 197.96 | 657.14 | 0.11 | 67.71 | 0.06 |
| 326.53 | 2828.57 | 0.07 | 40.40 | 0.06 |
| 157 | 528 | 0.11 | 67.5 | 0.05 |
| 256 | 960 | 0.049 | 134.9 | 0.04 |
| 283.67 | 542.86 | 0.20 | 65.32 | 0.04 |
| 204.08 | 714.29 | 0.16 | 43.75 | 0.04 |
| 200 | 672 | 0.11 | 67.5 | 0.04 |
| 342 | 960 | 0.066 | 134.9 | 0.04 |
| 161.22 | 1228.57 | 0.07 | 50.24 | 0.04 |
| 370 | 1246 | 0.11 | 67.5 | 0.03 |
| 393.88 | 885.71 | 0.11 | 97.28 | 0.03 |
| 271.43 | 828.57 | 0.07 | 109.94 | 0.03 |
| 242 | 960 | 0.093 | 67.5 | 0.03 |
| 289.80 | 1685.71 | 0.06 | 76.58 | 0.02 |
| 332.65 | 2600.00 | 0.06 | 51.39 | 0.02 |
| 200 | 960 | 0.077 | 67.5 | 0.02 |
| 285 | 1104 | 0.096 | 67.5 | 0.02 |
| 308.16 | 1000.00 | 0.09 | 88.82 | 0.02 |
| 285 | 1392 | 0.076 | 67.5 | 0.02 |
| 157 | 960 | 0.061 | 67.5 | 0.02 |
| 285 | 816 | 0.129 | 67.5 | 0.02 |
| 369.39 | 1457.14 | 0.08 | 78.62 | 0.02 |
| 242 | 815 | 0.11 | 67.5 | 0.02 |
| 179.59 | 1857.14 | 0.05 | 45.56 | 0.02 |
| 327 | 1101 | 0.11 | 67.5 | 0.02 |
| 285 | 1248 | 0.085 | 67.5 | 0.02 |
| 253.06 | 771.43 | 0.13 | 64.81 | 0.01 |
| 327 | 960 | 0.126 | 67.5 | 0.01 |

Inconel 718 alloy is often used to form critical components such as gas turbine components, pump parts, rocket motors, thrust reversers, cryogenic storage tanks, and the like. Minimizing porosity is important to maximize properties such as tensile strength and elongation at break. Advantageously, locally tailoring each build layer within a stack and using a multi-variable evaluation can be used to provide a parameter set for a particular additive manufacturing system that minimizes porosity. In addition to high density, this allows a level of microstructure control that could be used to change strength and creep performance independently in different locations of the part.

Figure 11:
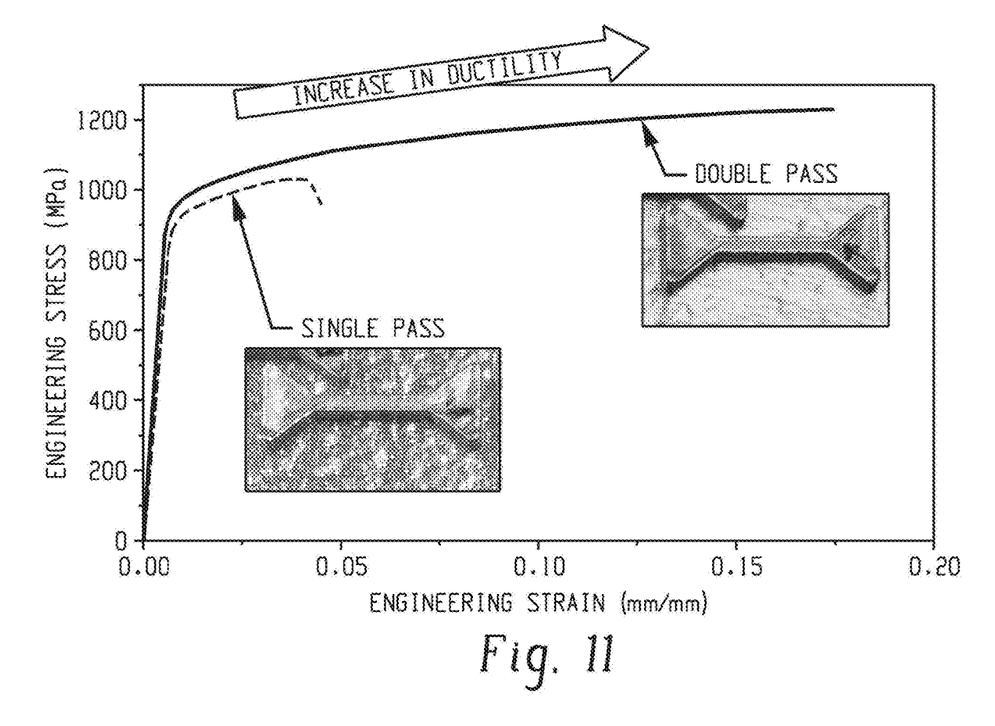
FIG. 11 graphically illustrates engineering stress as a function of engineering strain for a steel alloy coupon before and after secondary heat treatment in accordance with one or more embodiments of the present invention.

In another example, a high strength stainless steel alloy was process manipulated using the EOS M290 metal printer to change the strength and ductility properties of a steel alloy coupon. The steel alloy coupon was first formed using the metal printer using the parameters shown in Table 7 below (first pass, melting energy 49.1 J/mm³) and subsequently subjected to a secondary heat treatment (second pass, heat treatment energy 14 J/mm³) to significantly improve strength and ductility properties by changing the microstructure formed in situ. Processing in this manner essentially replicates and/or improves upon conventional post heat treatment of spherodizing or solutionizing and aging heat treatment of a part in its entirety for increasing strength properties, which is typically required to manipulate the bulk properties of the part. By using the AM processes described herein, different voxels and/or portions within the article can advantageously be selectively and locally manipulated without the need for post solutionizing and aging. As such, unlike the solutionizing and aging heat treatments that are typically applied to an entire structure within a furnace, for example, the present AM processes can provide structures that have selected voxels and/or portions of the structure that exhibit different strength and ductility properties, among others, as may be desired for different applications. FIG. 11 graphically illustrates the effect on ductility as evidenced by the increased engineering strain for the steel alloy coupon as formed using the AM process and the same steel alloy coupon after being subjected to a secondary heat treatment below the melting temperature of the steel alloy. An increase in engineering strain of greater than 3× was observed for the steel alloy coupon subjected to a second pass of heat treatment.

TABLE 7

| Steel Alloy | Power W | Point Distance μm | Speed cm/s | Hatch nm | Layer μm | Energy J/mm³ |
|---|---|---|---|---|---|---|
| First Pass | 180 | 60 | 90 | 110 | 50 | 49.1 |
| Second Pass | 70 | 20 | 20 | 110 | 50 | 14 |

Figure 12:
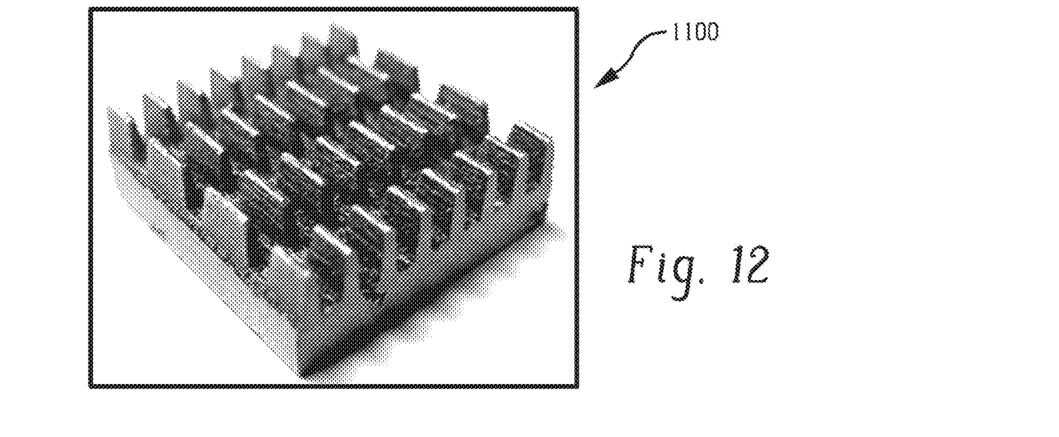
FIG. 12 pictorially illustrates a heat sink including a tungsten substrate and a plurality of copper fins thereon in accordance with one or more embodiments of the present invention.
Figure 13:
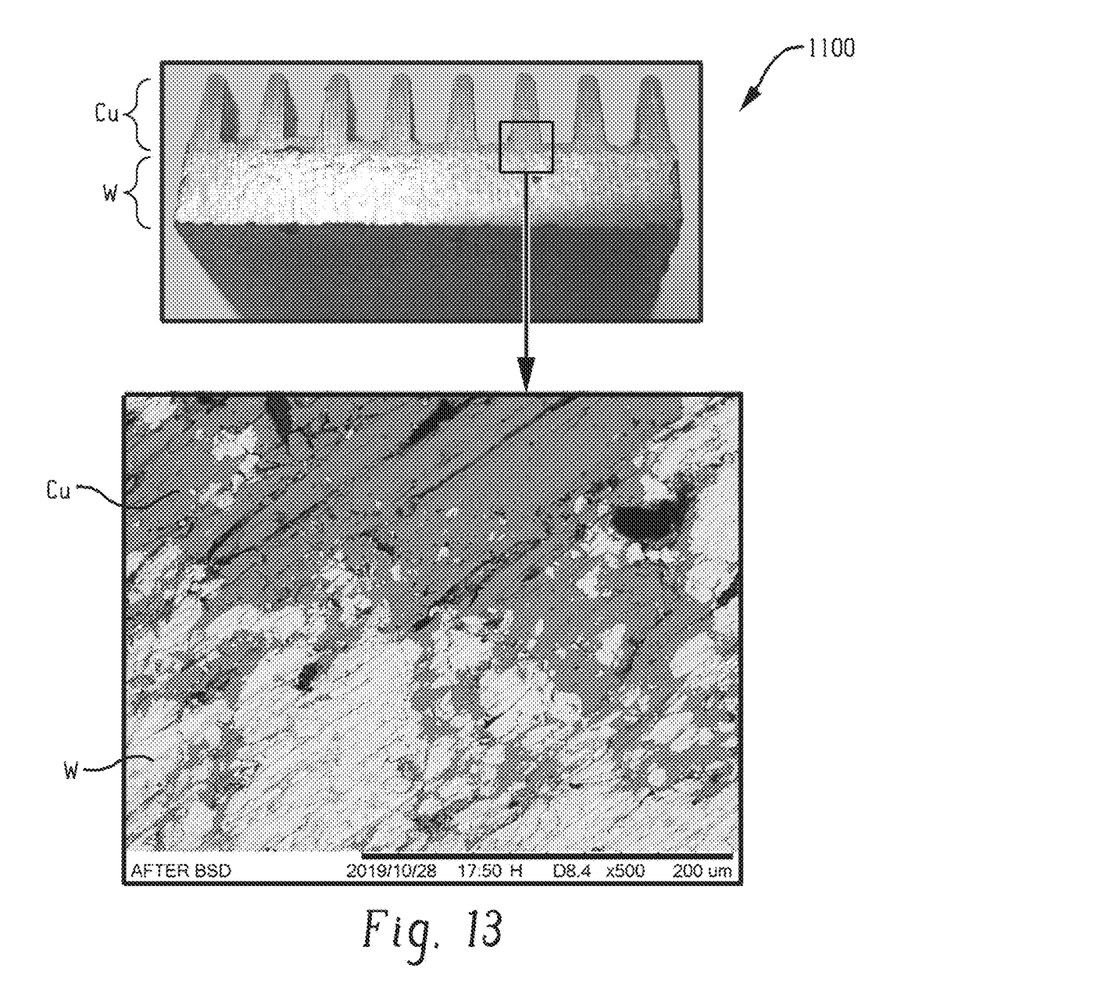
FIG. 13 pictorially illustrates a cross section of the heat sink of FIG. 12 and a micrograph of a tungsten-copper interface subsequent to secondary heat treatment in accordance with one or more embodiments of the present invention.

In another example, secondary heat treatment can be used to locally change the mechanical properties such as adhesion at an interface between two metals. FIG. 12 depicts a heat sink structure 1100 including a tungsten metal (W) base layer and a plurality of copper (Cu) fins attached to the tungsten metal base layer. Adhesive strength between copper and tungsten can be relatively poor given the poor wetting of the copper on the tungsten surface. In this example, tailored energy beam parameters including a power level, an exposure time, a hatch spacing, a point distance, and an energy density were used to improve penetration and adhesion of the copper into tungsten. FIG. 13 pictorially illustrates a cross section of a tungsten metal interface using EBSD. In this example, the energy beam parameters were changed along a path intersecting the interface along an x-z plane to increase intermixing between the two metals within the interface and provide improved adhesion. Increased adhesion was observed. Alternatively, the scan path with the desired energy beam parameters can be provided in one or more zones within an x-y plane of the interface to improve interpenetration of the metals and improved adhesion.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

What is claimed is:

1. A process for forming a three-dimensional article, comprising:
   successively forming the three-dimensional article from a feedstock layer-by-layer via an additive manufacturing process, wherein the feedstock comprises a plurality of discrete metallic or non-metallic particles, wherein successively forming comprises exposing at least one voxel in a two-dimensional layer to an energy source configured to provide a different local thermal profile relative to other voxels within the same two-dimensional layer and provide the three-dimensional article with at least one different property relative to other voxels within the same two-dimensional layer within the three-dimensional article.

2. The process of claim 1, wherein the at least one different property comprises a local change in microstructure, a local change in a chemical composition, a local change in a functional property and/or introduction of a local defect.

3. The process of claim 1, wherein exposing the at least one voxel within the two-dimensional layer to the different thermal profile comprises changing one or more parameters associated with an energy beam selected from the group consisting of power, exposure time, point distance, hatch spacing, velocity, and energy density.

4. The process of claim 3, wherein the exposure time is defined by a scanning velocity for the energy beam, wherein the scanning velocity is in a range from about 10 millimeters per second (mm/s) to about 10,000 mm/s, wherein the hatch spacing is in a range from about 10 µm to about 5000 µm, wherein the energy density is in a range from about 10 Joules per millimeters cubed ($J/mm^3$) to about 10,000 $J/mm^3$, and wherein the point distance is in a range of about 10 µm to about 5000 µm.

5. The process of claim 1, wherein each layer in the layer by layer buildup is at a thickness within a range of about 10 µm to about 5,000 µm.

6. The process of claim 1, wherein the three-dimensional article is a shape memory alloy and the exposing of the at least one voxel and/or portion in the two-dimensional layer to a different thermal profile changes a martensite and/or an austenite transformation temperature and/or a superelasticity property in the exposed at least one voxel of the two-dimensional layer.

7. The process of claim 1, wherein the particles have a particle size within a range of about 10 µm to about 5000 µm.

8. The process of claim 1, wherein the energy beam is pulsed.

9. The process of claim 1, wherein the non-metallic particles comprise a ceramic.

* * * * *